(12) United States Patent
Porikli et al.

(10) Patent No.: US 8,041,080 B2
(45) Date of Patent: Oct. 18, 2011

(54) METHOD FOR RECOGNIZING TRAFFIC SIGNS

(75) Inventors: Fatih M. Porikli, Watertown, MA (US); Andrzej Ruta, Gliwice (PL)

(73) Assignee: Mitsubi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/414,981

(22) Filed: Mar. 31, 2009

(65) Prior Publication Data

US 2011/0109476 A1    May 12, 2011

(51) Int. Cl.
*G06K 9/00* (2006.01)
(52) U.S. Cl. ........ 382/104; 382/159; 382/190; 382/224; 382/170; 382/228; 340/905

(58) Field of Classification Search ............. 382/104, 382/159, 190, 118, 165, 224, 170, 131, 228; 340/901, 905, 907, 933; 348/61, 113; 706/20
See application file for complete search history.

(56) References Cited

U.S. PATENT DOCUMENTS

| 2009/0290791 A1* | 11/2009 | Holub et al. | 382/164 |
| 2010/0080439 A1* | 4/2010 | Karam et al. | 382/133 |
| 2010/0189354 A1* | 7/2010 | De Campos et al. | 382/190 |

* cited by examiner

*Primary Examiner* — Samir Ahmed
*Assistant Examiner* — Ali Bayat
(74) *Attorney, Agent, or Firm* — Dirk Brinkman; Gene Vinokur

(57) ABSTRACT

A method recognizes a set of traffic signs in a sequence of images acquired of a vehicle environment by a camera mounted in a moving vehicle by detecting in each image, a region of interest (ROI) using a parameter space transform. The ROI is tracked and classified as a particular one of the signs. The classifier only uses a same class and a different class, and a regression function to update the classifier.

11 Claims, 7 Drawing Sheets

METHOD FOR RECOGNIZING TRAFFIC SIGNS

FIELD OF THE INVENTION

This invention relates generally to computer vision, and more particularly to recognizing traffic signs in a video acquired of a scene by a camera in a moving vehicle.

BACKGROUND OF THE INVENTION

Traffic signs are an inherent part of a traffic environment. The signs regulate the flow of the vehicles, give specific information, or warn against unexpected road circumstances. For that reason, perception and fast interpretation of signs is critical for the safety of the drivers of the vehicles. One way to do this is with a computer vision application.

The designs of traffic signs are usually to some national or international standard, e.g., the European Vienna Convention on Road Traffic treaty 1968.

A conventional sign detection methods generally use a heuristic based on available prior knowledge about traffic signs to define how to a segment images acquired of a scene to find regions of interest regions, and to define acceptable geometrical relationships between the color and shape of signs. The major deficiency of those methods is a lack of a solid theoretical foundation, and a high parametrization.

Another method uses a trainable cascade of boosted classifiers to learn the most discriminative local image descriptors for sign detection. Other methods track traffic signs over time. However most of those methods use a relatively simple scheme based on a predefined motion model and some sort of geometrical Kalman filtering.

Typically, a cross-correlation template matching technique is used for sign classification. Other methods involve neural networks, or kernel density estimation.

Other sign detection and recognition methods are described in the following U.S. Pat. No. 7,466,841, Method for traffic sign detection, U.S. Pat. No. 6,813,545—Automatic traffic sign recognition, U.S. Pat. No. 6,801,638,—Device and method for recognizing traffic signs, and U.S Applications 20080137908—Detecting and recognizing traffic signs, 20060034484—Method for traffic sign detection, and 20040010352—Automatic traffic sign recognition, incorporated herein by reference.

SUMMARY OF THE INVENTION

The embodiments of the invention provide a method and system for recognizing traffic signs. The system can be embedded in a moving vehicle. The method uses a parameter space transform to detect circular signs and can be extended to any parameterized shapes including square, rectangle, triangle, hexagonal, and octagonal signs.

The sign is tracked using an instant-specific regression function that encodes a relationship between a feature representation of the sign and an affine transform. This function is trained in real time using a regression selected from random distortions applied to a last stable image of the sign.

The method adapts an AdaBoost process to determine a sign similarity measure from example image pairs labeled either "same" or "different." This enables construction of an efficient multi-class classifier.

As known in the art, the Adaboost process combines a set of "weak" classifiers to construct a "strong" classifier. The relative terms weak and strong have special meaning in the Adaboost process as know in the art. Weak means that the classifier has higher error rate that the strong classifier. However, by combining the weak classifiers in a sequence, the effect is a classifier with a much lower error rate than any of the weak classifiers.

The invention uses a novel variant of the AdaBoost process that uses "same" or "different" similarity measures, and a winner-takes-all classification framework

DETAILED DESCRIPTION OF THE PREFERRED EMBODIMENT

Figure 1:
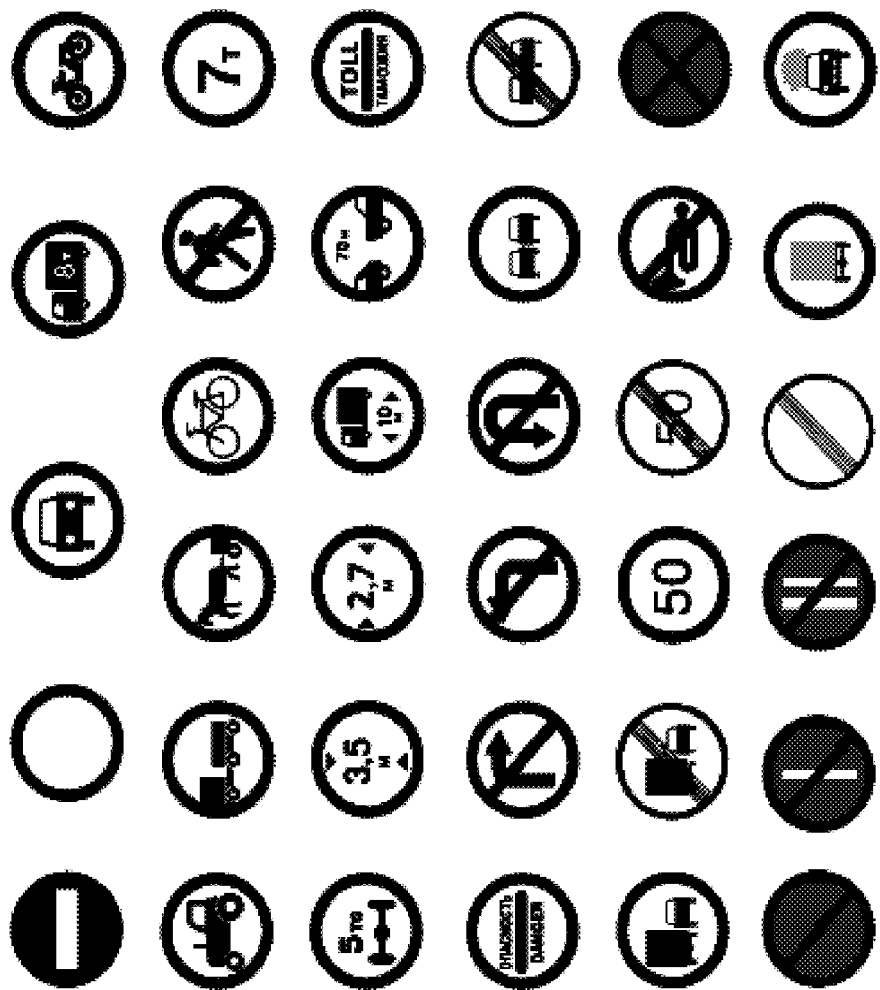
FIG. 1 are images of circular traffic signs recognized according to embodiments of the invention.

FIG. 1 shows a set of signs that can be recognized by embodiments of the invention. As shown in FIG. 1, many traffic signs are circular, which is considered in one aspect of the embodiments of the invention, although it is understood that the embodiments can be adapted for signs with other shapes and colors.

Figure 2:
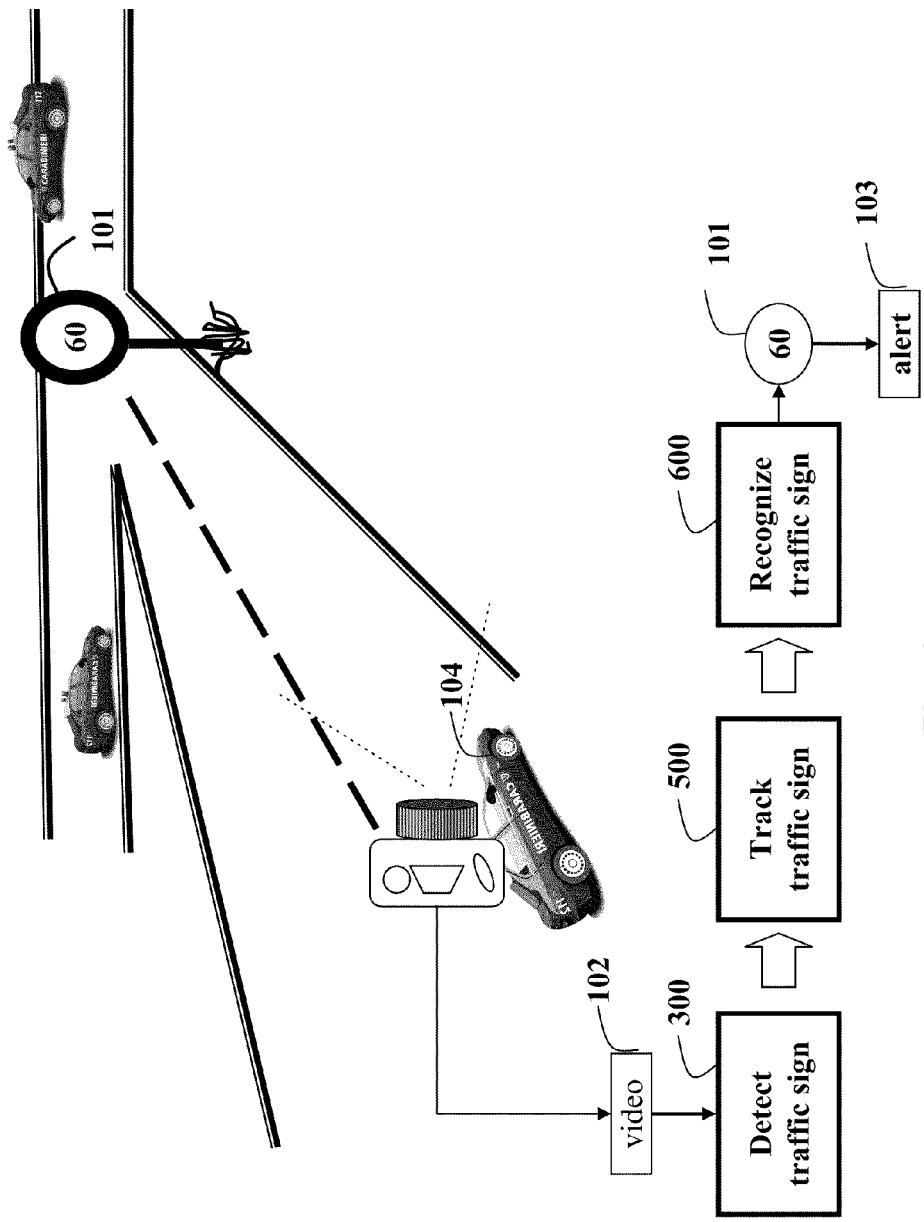
FIG. 2 is a block diagram of a method and system for recognizing a traffic sign according to embodiments of the invention.

FIG. 2 shows a method for detecting 300, tracking 500 and recognizing 600 a particular traffic sign 101 in a video 102 acquired of a vehicle environment scene 103 by a camera 104 in a moving vehicle 104.

After the sign has been recognized, an alert 103 can be indicated to the vehicle operator. The alert can be visual, a light signal, or an audio message. In an extreme danger case, the system can stop the vehicle or take some other evasive action.

The alert can indicate that the vehicle is traveling over the speed limit, or that the vehicle is approaching a stop sign, or a one-way sign. The set of signs can include danger warning signs, priority signs, prohibitory or restrictive signs, mandatory signs, special regulation signs, information, facilities, or service signs, and direction, position, or indication signs. After the sign disappears from view, that is, the tracking has failed, the alert can be canceled.

Figure 3:
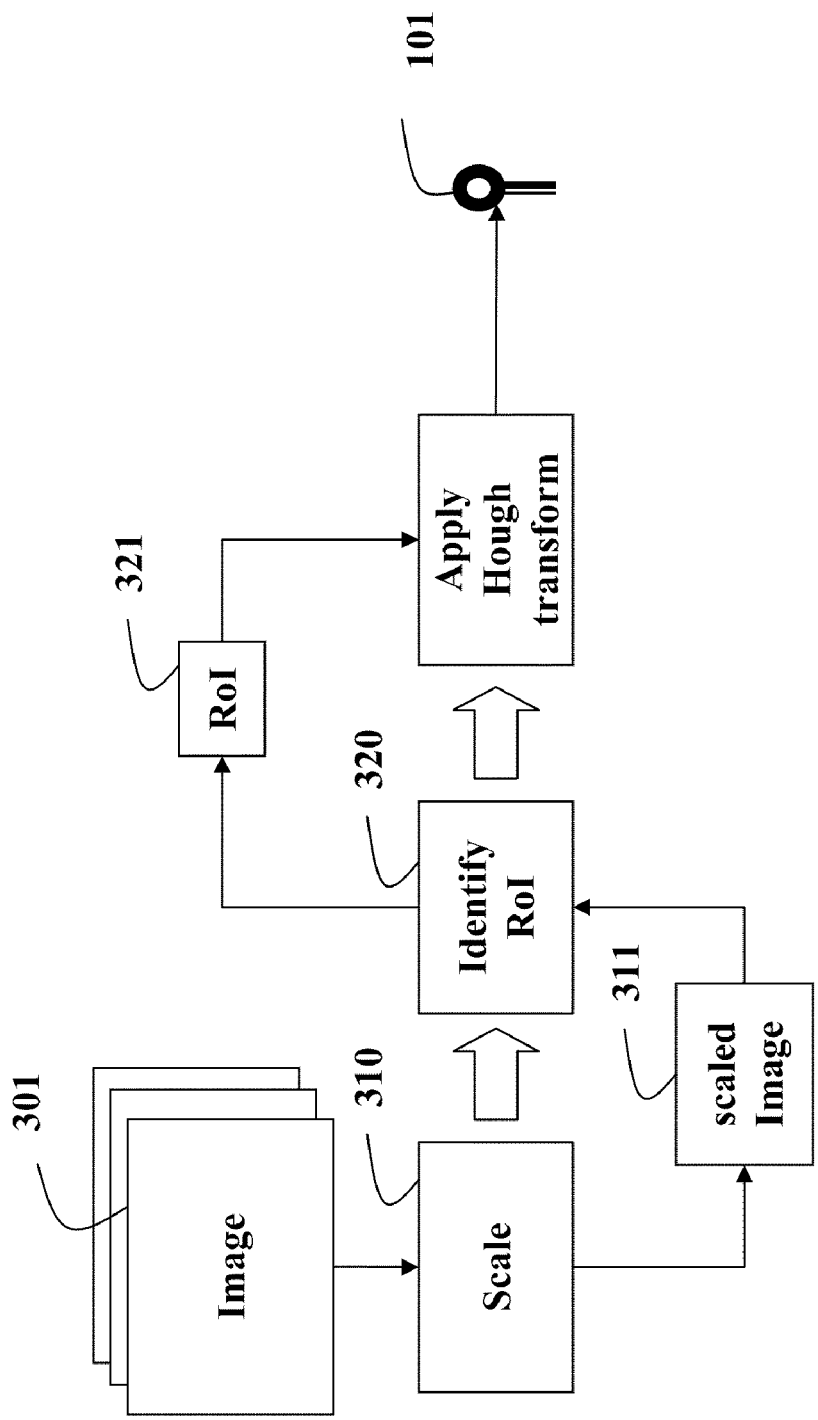
FIG. 3 is a block diagram of a method for detecting a traffic sign according to embodiments of the invention.

As shown in FIG. 3, the detecting scales 310 each image (frame) 301 of the video 102 to a size of 360×270 pixels 311. Region of interest (ROI) 321 are identified 320 in the scaled image using a quad tree technique.

Because the signs of interest have either a red or blue rim, we identify the sign boundary gradients with respect to the red and blue color channels in a gradient map. It is understood that other colors can be used.

Before computing the gradient map, a filter amplifies the red and blue pixels in the scene $$f_{RED}(x) = \max\left(0, \min\left(\frac{x_R - x_G}{s}, \frac{x_R - x_B}{s}\right)\right) \quad (1)$$
$$f_{BLUE}(x) = \max\left(0, \min\left(\frac{x_B - x_R}{s}, \frac{x_B - x_G}{s}\right)\right),$$

where $X_R$, $X_G$, $X_B$ denote the red, green and blue components of an input pixel, and $S=X_R+X_G+X_B$, an the function max returns a maximal value.

A parameter space transform is applied separately on the amplified red and blue gradient maps. The classical parameter space transform was concerned with the identification of lines in the image. However, it is known that it can also be extended to identify positions of other parameterized shapes. In one embodiment, we use a circular parameter space transform to achieve the initial detection. However, it should be understood that other shapes can be identified using the described method.

Our parameter space transform uses the image gradient information. Using the gradient magnitudes of image pixels, it votes for the corresponding parameter bins in the space. A parameter bin represents a shape hypothesis. For instance, a parameter space of the circular shapes is spanned by the x and y locations of the center of the circle, and the radius r of the circle. In this three-dimensional parameter space, a point corresponds to a circle in the image with the x, y, and r values specified by the indices of the point.

Before the transformation, we quantize the parameter space at the precision that we want. To obtain the parameter space transformation, we scan the input image. For each image pixel, we find the possible shapes passing through that image pixel by solving the shape equation, i.e. the circle equation for circular shapes. We increment the value of the corresponding points in the parameter space by the magnitude of the image pixels gradient.

To improve the speed, we first establish a minimal amount of red and blue to gradient that can be contained in the ROI. Then, the entire image is checked against the total color gradient contained using the appropriate integral image, see U.S. Patent Application 20020102024, incorporated herein by reference.

Because the total gradient is typically far above a predefined threshold, the image is partitioned into four quarters and each quarter is independently processed in the identical way. The process is stopped when the current input region contains fewer gradients than the threshold, or upon reaching a predefined number of depth levels, e.g., six. The above-threshold lowest-level regions are clustered and the above parameter space transform is constructed as bounding rectangles of the clusters. This way, we can very quickly discard the irrelevant portions of the scene, e.g. sky, road side and road surface.

Instead of setting a high threshold in the parameter space, we keep the threshold relatively low, but integrate the multiple hypothetical circles produced using the refinement technique discussed in the next section.

After the parameter space transformation, we obtain a probability density map where each point in the parameter space indicates the likelihood of the target shape having the corresponding parameters, e.g. x, y, r, of that point.

Detection Refinement

A kernel density estimation technique is used to model the probability density map and its maxima are found using a variant of the mean-shift process, i.e., a confidence-weighted mean shift operator. Mean shift operator locates stationary points of the distributions given discrete data sampled from that function We first characterize each positive hypothesis with a vector, $X_j=[x_j, y_j, r_j]$, encoding the position of the centroid of the circle, and its radius, and a confidence value, $q_j$, which we relate to the normalized number of "votes" cast for this circle in the parameter space transform space. Assuming that $f(x)$ is the underlying probability density map of x, stationary points of this distribution are found via alternate computation of the mean-shift vector, and translation of the current kernel window by this vector, until convergence.

Our modified mean-shift vector is made sensitive to the confidence of the input points X follows $$m_{h,G} = \frac{\sum_{j=1}^{n} x_j q_j g\left\|\frac{x-x_j}{h}\right\|^2}{\sum_{j=1}^{n} q_j g\left\|\frac{x-x_j}{h}\right\|^2} - x, \quad (2)$$

where $g(x)$ is the underlying gradient density estimator, and h is the bandwidth parameter determining the scale of the estimated density. Incorporating the confidence terms $q_j$ in Equation (2) is equivalent to amplifying the density gradients pointing towards the more reliably detected circle locations. The modes of x correspond to the traffic sign we track 400.

Tracking Traffic Signs

To be able to recognize traffic signs in a video acquired by a camera mounted in a moving vehicle, it is necessary to have a view-independent object detector. Training such a detector directly is difficult because feature descriptors need to be to be highly discriminative, and pose-invariant.

Instead of devising a pose-independent feature representation of the signs, we train an application-specific motion model, and integrate the model with the existing pose-dependent object detector to make it pose-independent.

Figure 4:
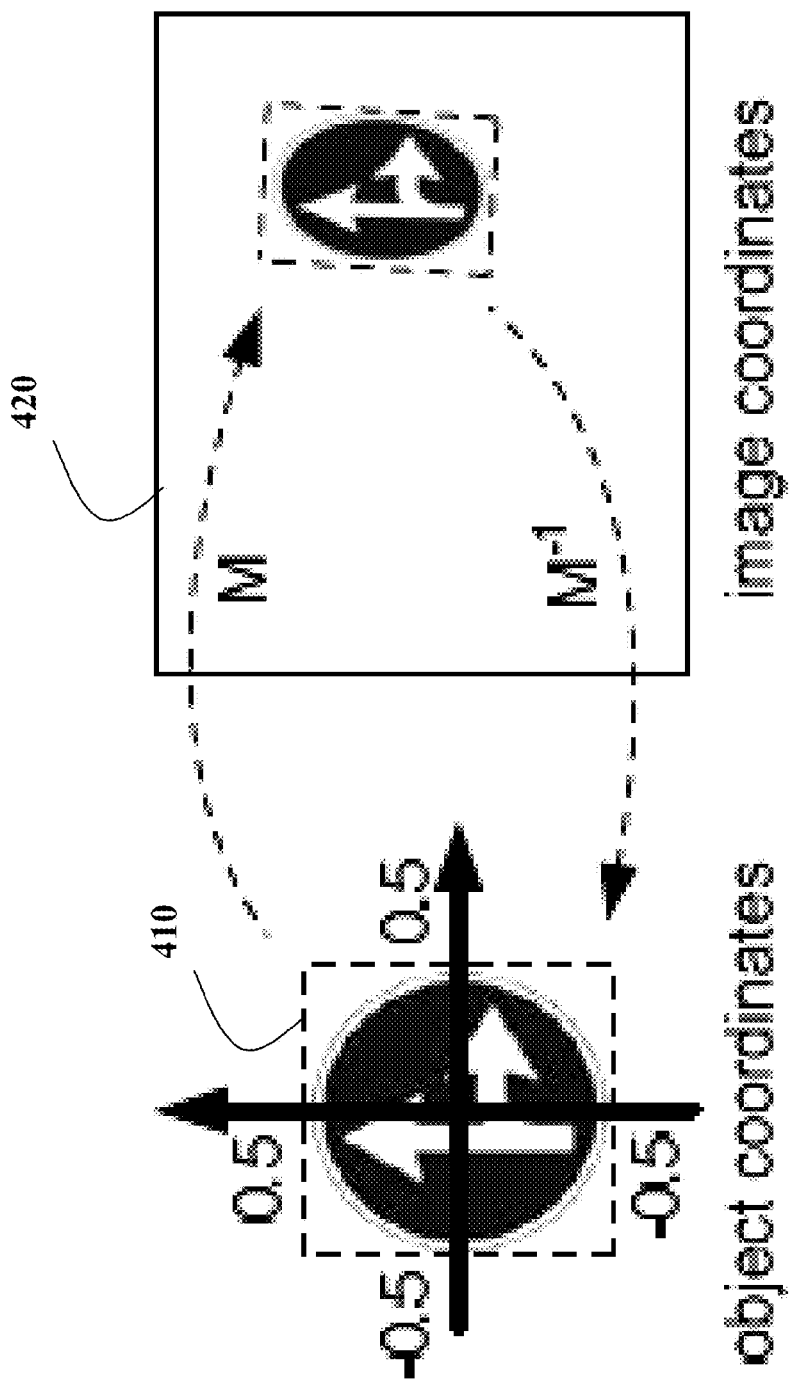
FIG. 4 is a block diagram of transformation matrices according to embodiments of the invention.

As shown in FIG. 4, an affine matrix M, and its inverse $M^{-1}$ transforms between object coordinates 410 and image coordinates 420. The matrix M is for a unit square at an origin to an affine region enclosing the target object in the image.

Our goal is to estimate the transformation matrix $M_t$ at time t, given the images $I_0, \ldots, t$ up to that time, and an initial transformation $M_0$. $M_t$ is modeled recursively as $$M_t = M_{t-1} \Delta M_t, \quad (3)$$

which means that it is sufficient to estimate only the increment $\Delta M_t$ corresponding to the motion of the sign from time t−1 to t in object coordinates. This is determined by a regression function:

$$\Delta M_t = f(o_t(M_{t-1}^{-1})), \quad (4)$$

where $$o_t(M_{t-1}^{-1})$$

denotes an image descriptor applied to the previous image, after mapping the image to the unit rectangle.

To determine the function $f$, it is necessary to know an initial pose of the object, $M_0$, and the image $I_0$ at time $t_0$.

Figure 5:
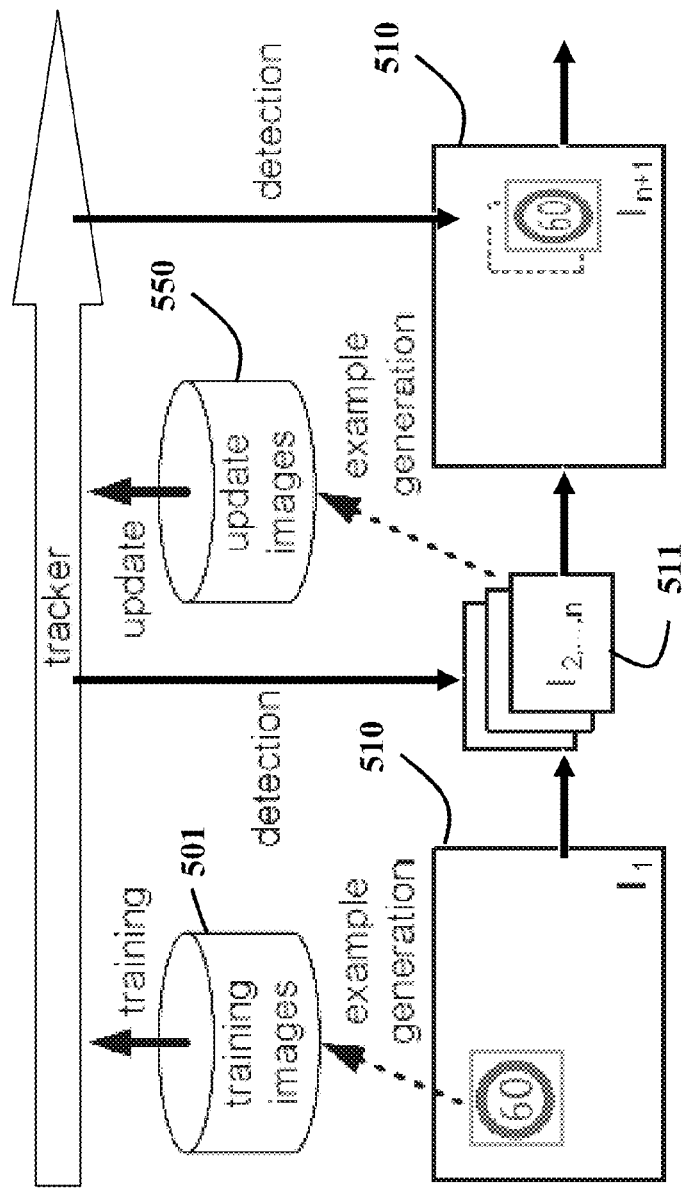
FIG. 5 is a block diagram of a method for tracking a detected traffic sign according to embodiments of the invention.

As shown in FIG. 5, training examples 501 are generated 510 as pairs ($o^i_0$, $\Delta M_i$), where $\Delta M_i$ are random deformation matrices and $o^i_0 = o_0(\Delta M_i^{-1} M_0^{-i})$. The regression function is trained with a Lie algebra, see U.S. Application 20080240499, Jointly Registering Images While Tracking Moving Objects with Moving Cameras, incorporated herein by reference.

For each detected ROI after the refinement stage, we learn an instant-specific regression function as defined above and initialize a regression based tracked. In other words, after the sign has been detected, and an instance-specific tracker 550 is initialized with the region corresponding to the bounding rectangle of the detected circle.

Random deformations are generated from the next image $I_i$ 511 and used for instant training. The trained tracker detects the sign in n subsequent frames, each being used to generate and enqueue m new random deformations.

As in a realistic traffic situation, the scene is often complex and changes fast. As a result, the accuracy of the tracker is likely to deteriorate very quickly die to contaminating the training examples with the unwanted background fragments.

Therefore, we update 520 the instant-specific regression function after each n frames by re-training the function on the collected portion of n×m training examples. The updated tracker is then used to re-estimate the pose of the observed sign. Such a periodic update enables us to recover from misalignments likely to occur during the tracking.

Recognizing Traffic Signs

Recognition of traffic signs is a challenging multi-class problem, particularly because many signs are similar to one another, see FIG. 1. We use a one-versus-all (OVA) classifiers that assume an existence of a single separator between each class and all other classes. As known in the art, OVA decision trees learn k individual binary classifiers, each one to distinguish the instances of a single class from the instances of all other classes.

The techniques are implemented using a winner-takes-all strategy that associates a real-valued score with each class. An example belongs to the class which assigns it the highest score. The winner-take-all strategy connotes the principle of plurality voting.

Figure 6:
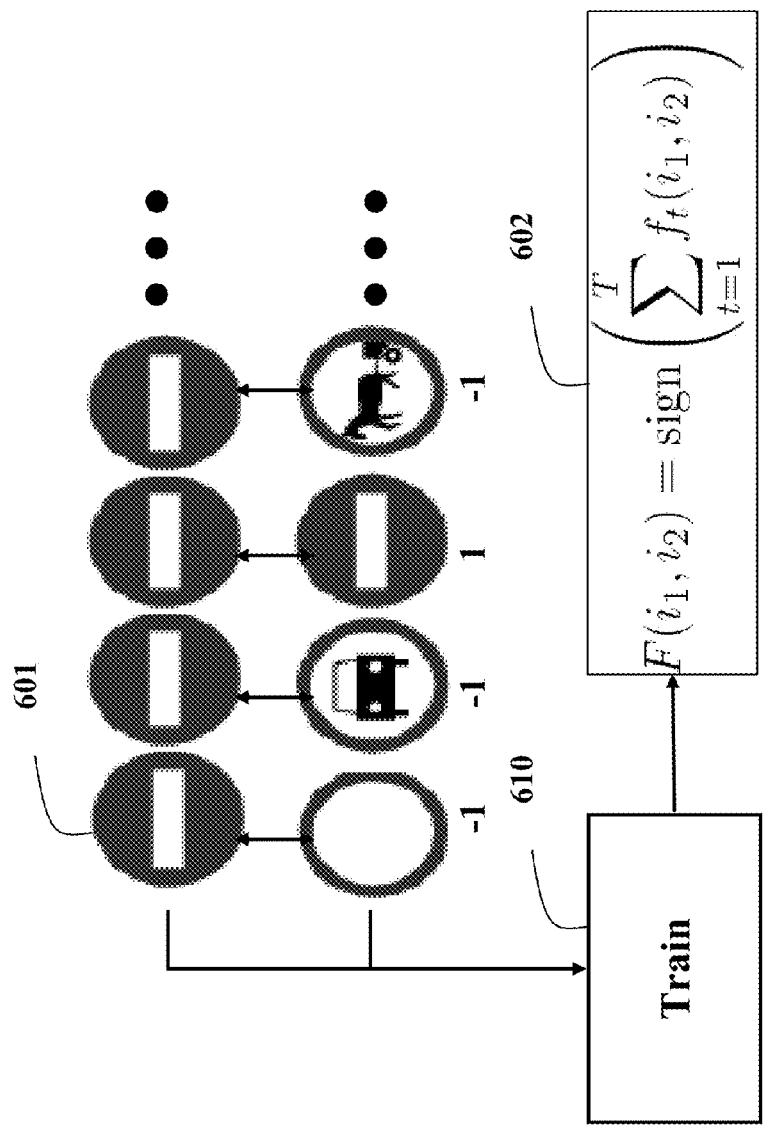
FIG. 6 is a block diagram of a method for tracking a detected traffic sign according to embodiments of the invention.

As shown in FIG. 6, our classifier F(x) 602 only uses two classes: "same" and "different," and is trained 610 using training image pairs, i.e. $x=(i_1, i_2)$ 601. The pairs of images representing the same sign are labeled y=1 (positive), and the pairs representing two different signs are labeled y=−1 (negative). In other words, the pairs are all possible combinations of the traffic signs, which of course include pairs with the same traffic sign.

In other words, we train a classifier for each class using one-versus-all technique, apply these classifiers to given ROI, and assign the classifier that gives the highest score as the identified sign class.

The real-valued discriminant function F is trained learned using a modified AdaBoost process.

Generally, AdaBoost is a machine learning process adaptive in the sense that subsequent classifiers built are improved in favor of those instances misclassified by previous classifiers. AdaBoost calls a weak classifier repeatedly in a series of rounds. For each call, a distribution of weights is updated that indicates the importance of examples in the data set for the classification. On each round, the weights of each incorrectly classified example are increased, or alternatively, the weights of each correctly classified example are decreased, so that the updated classifier focuses more on those examples.

A sum of image features $f_j$ is $$F(i_1, i_2) = \sum_{j=1}^{N} f_j(i_1, i_2). \quad (5)$$

Each feature evaluates to:

$$f_j(i_1, i_2) = \begin{cases} \alpha & \text{if } d(\phi_j(i_1), \phi_j(i_2)) < t_j \\ \beta & \text{otherwise,} \end{cases} \quad (6)$$

where $\phi_j$ is a filter defined over a class of image descriptors, d is a distance metric for the descriptors, and $t_j$ is a threshold for the feature. The total weight of these positive examples that are labeled positive by this weak classifier (true positives) is $W^+_+$, and the total weight of those that are labeled negative (false negatives) is $W^-_+$. By analogy, the total weights of true negatives and false positives are $W^-_-$ and $W^+_-$, respectively.

In each boosting round, the weak classifier is selected to minimize the weighted error of the training examples:

$$e_j = W^-_+ + W^+_-. \quad (7)$$

Good weak hypotheses are obtained by minimizing $$Z = \sum_{k=1}^{N} w_k e^{-y_k f(x_k)}, \quad (8)$$

where N is the total number of training examples, y is the label of the training sample (+1 for positive samples, and −1 for the negative sample), and w is the weight of the corresponding sample.

Through several transformations it can be shown that $$Z = W^+_+ e^{-\alpha} + W^-_+ e^{-\beta} + W^+_- e^{\alpha} + W^-_- e^{\beta}. \quad (9)$$

Taking partial derivatives of Z with respect to α and β, and setting each to zero, determines the optimal values of each parameter to set in a given boosting round:

$$\alpha = \frac{1}{2} \log \left( \frac{w^+_+}{w^+_-} \right) \beta = \frac{1}{2} \log \left( \frac{w^-_+}{w^-_-} \right). \quad (10)$$

Our AdaBoost yields a strong classification function:

$$F(i_1, i_2) = \text{sign} \left( \sum_{t=1}^{T} f_t(i_1, i_2) \right), \quad (11)$$

where t and T represent, the time for each image, and T is a total time.

By omitting sign, the value of this function can be treated as a degree of similarity of two input images. As one of those images $i_1$ is a prototype image of known class ($i_1 = p_i$), our traffic sign classifier assigns such a label to the other unknown image, that satisfies:

$$l(i) = \underset{k}{\text{argmax}}(p_k, i). \quad (12)$$

In other words, l(i) is determined from the prototype that is most similar to the test image. To classify the sequence of images, $i_1, \ldots, t$, the maximum rule in Equation (12) is applied to the sum of $F(p_k, i_t)$ terms over all images $i_t$. Each $i_t$ denotes a warped image of a sign obtained by applying the inverse of the transformation matrix $M_t$ to the image at time t.

Figure 7:
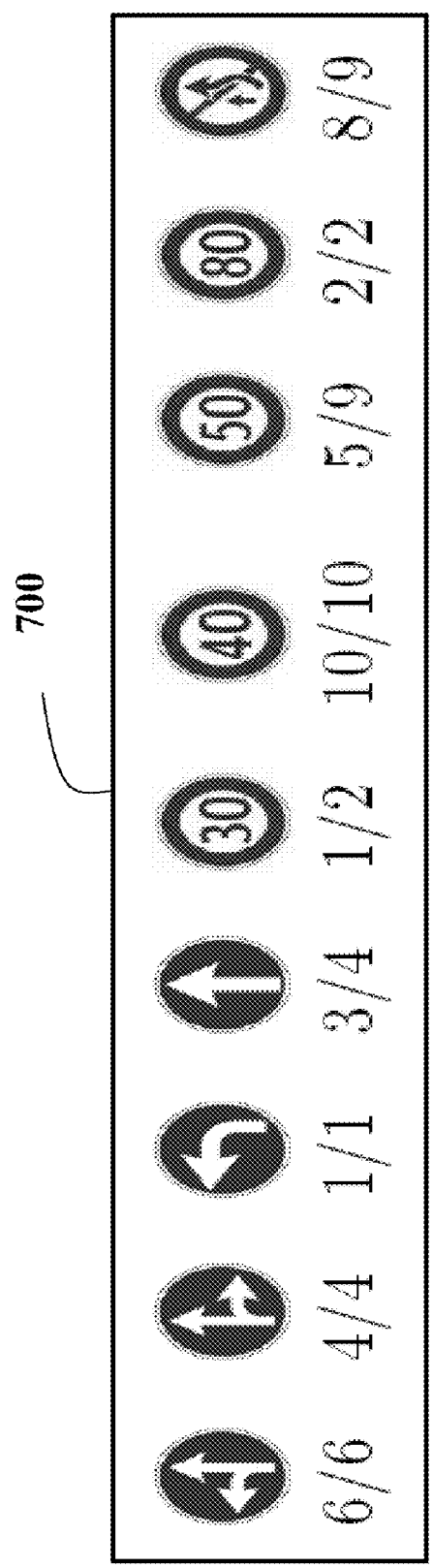
FIG. 7 is a block diagram an input sequence of sign and a numbers of correctly classified signs of each class as a function of total numbers of such signs.

The classification results where an overall error rate of the classifier did not exceed 15%. FIG. 7 shows the numbers of correctly classified signs of each class as a function of total numbers of such signs detected in the input sequences 700.

EFFECT OF THE INVENTION

The embodiments of the invention provide a comprehensive approach to recognizing traffic signs using a vehicle-mounted camera. The tracker effectively corrects affine distortions the road signs are subject to. The tracker is trained and periodically updated using the Lie algebra of the motion group. A detected sign is classified by maximizing its similarity to the class's prototype image. This similarity is estimated by a linear combination of local image similarities and is trained with image pairs using a novel variant of the AdaBoost process. The method correctly classifies most road signs in real time.

For initial candidate sign detection we use a circular parameter space transform. It is augmented with a refinement process based on a Confidence-weighted Mean Shift clustering of the response of the detector.

To track detecting signs, we employ a trainable regression function that compensates for affine distortions, making our detector pose-invariant and hence more accurate.

We construct a traffic sign classifier based on the concept of a trainable similarity. The novel AdaBoost process is utilized to learn a robust sign similarity measure from image pairs labeled either "same" or "different." This measure is further directly used within the winner-takes-all classification framework.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for recognizing a particular traffic sign of a set of traffic signs in a sequence of images acquired of a vehicle environment by a camera mounted in a moving vehicle, comprising a processor for performing steps of the method, comprising the steps of:
    determining, in each image, a probability density map using a parameter space transform;
    detecting, in each image, a region of interest (ROI) using a kernel density estimator on the probability density map;
    tracking, in each next image after the ROI is detected, the ROI using an instant-specific regression function; and
    recognizing the ROI as contain the particular traffic sign of the set of traffic signs using multiple one-versus-all (OVA) classifiers, wherein each classifier only uses a same class and a different class, and a final decision is taken using a winner-takes-all strategy that associates a real-valued score with each class, and the final decision recognizes the particular traffic sign.

2. The method of claim 1, further comprising:
    generating an alert in response to recognizing the particular sign.

3. The method of claim 1, further comprising:
    scaling each image, to a fixed size;
    filtering, each image, to amplify a set of predetermine colors;
    generating a gradient map for a set of predetermined colors;
    applying the parameter space transform to the gradient map; and
    treating a response of parameter space transform as a probability density map a confidence-weighted mean shift operator.

4. The method of claim 1, wherein the detecting is view-independent.

5. The method of claim 4, wherein the instant-specific regression uses an affine matrix M transform and an inverse $M^{-1}$ to transform between object coordinates and image coordinates, wherein the matrix M is for a unit square at an origin to an affine region enclosing the ROI.

6. The method of claim 1, wherein the tracking further comprises:
    generating random deformations for each next image.

7. The method of claim 1, wherein the classifier is trained using training images of all possible pairs of the set of traffic signs.

8. The method of claim 7, wherein the classifier is trained using a modified AdaBoost process.

9. The method of claim 8, wherein the Adaboost process is trained with a sum of image features $f_j$ $$F(i_1, i_2) = \sum_{j=1}^{N} f_j(i_1, i_2),$$

where $i_1$ and $i_2$ are the N pairs of images, and each feature evaluates to $$f_j(i_1, i_2) = \begin{cases} \alpha & \text{if } d(\phi_j(i_1), \phi_j(i_2)) < t_j \\ \beta & \text{otherwise,} \end{cases}$$

where $\phi_j$ is a filter defined over a class of image descriptors, d is a distance metric for the descriptors, and $t_j$ is a threshold for the feature.

10. The method of claim 8, wherein the AdaBoost process minimizes a weighted error of the training examples, which is $$e_j = W_+^- + W_-^+,$$

where $W_+^-$ and $W_-^+$ indicate false negatives and false positives, respectively.

11. The method of claim 9, wherein the Adaboost classifier is $$F(i_1, i_2) = \text{sign}\left(\sum_{t=1}^{T} f_t(i_1, i_2)\right),$$

where t and T represent, the time for each image, and T is a total time.

* * * * *